United States Patent
Czichy et al.

(10) Patent No.: US 10,073,335 B2
(45) Date of Patent: Sep. 11, 2018

(54) PROJECTION DEVICE AND METHOD FOR PROJECTING AT LEAST ONE IMAGE ONTO A PROJECTION SURFACE

(71) Applicant: OSRAM GmbH, Munich (DE)

(72) Inventors: Marc Czichy, Berlin (DE); Michael Heise, Berlin (DE); Markus Baier, Munich (DE); Norbert Magg, Berlin (DE); Daniel Sixtensson, Potsdam (DE)

(73) Assignee: OSRAM GmbH, Munich (DE)

(*) Notice: Subject to any disclaimer, the term of this patent is extended or adjusted under 35 U.S.C. 154(b) by 0 days.

(21) Appl. No.: 15/517,176

(22) PCT Filed: Sep. 29, 2015

(86) PCT No.: PCT/EP2015/072321
§ 371 (c)(1),
(2) Date: Apr. 6, 2017

(87) PCT Pub. No.: WO2016/055299
PCT Pub. Date: Apr. 14, 2016

(65) Prior Publication Data
US 2017/0299954 A1    Oct. 19, 2017

(30) Foreign Application Priority Data
Oct. 7, 2014 (DE) .................. 10 2014 220 275

(51) Int. Cl.
*G03B 21/00* (2006.01)
*G03B 21/20* (2006.01)
(Continued)

(52) U.S. Cl.
CPC ......... *G03B 21/206* (2013.01); *G03B 21/005* (2013.01); *G03B 21/006* (2013.01);
(Continued)

(58) Field of Classification Search
CPC G03B 21/006; G03B 21/2026; G03B 21/206; G03B 21/005; H04N 9/3155; H05B 41/2928; H05B 41/36; H05B 41/16
See application file for complete search history.

(56) References Cited

U.S. PATENT DOCUMENTS

2010/0244718 A1* 9/2010 Pollmann-Retsch ................ H05B 41/2928 315/246
2011/0317133 A1* 12/2011 Brueckel ............ H05B 41/2928 353/85
(Continued)

FOREIGN PATENT DOCUMENTS

| CN | 103069927 A | 4/2013 |
| DE | 10 2007 057 772 A1 | 6/2009 |

(Continued)

OTHER PUBLICATIONS

International Search Report based on application No. PCT/EP2015/072321 (5 pages + 2 pages English translation) dated Dec. 9, 2015.
(Continued)

*Primary Examiner* — Sultan Chowdhury
*Assistant Examiner* — Magda Cruz
(74) *Attorney, Agent, or Firm* — Viering Jentschura & Partner MBB (57) ABSTRACT

A projection device for projecting at least one image onto a projection surface is provided. According to the present disclosure, a control device of the projection device is designed, on the basis of an evaluation of at least one measured value of a measuring device of the projection device determined during a drive of a discharge lamp of the projection device with a current waveform to be checked, to check the current waveform in respect of its suitability for minimizing an electrode burn-back of a first electrode and a second electrode, and in the case of a positive check result,
(Continued)

to retain the checked current waveform, and in the case of a negative check result, depending on a checked commutation vector characterizing the checked current waveform, to create, by means of a specifiable algorithm, a modified commutation vector that characterizes a modified current waveform.

19 Claims, 5 Drawing Sheets

(51) Int. Cl.
  *H05B 41/36* (2006.01)
  *H04N 9/31* (2006.01)
  *H05B 41/292* (2006.01)

(52) U.S. Cl.
  CPC ....... *G03B 21/2026* (2013.01); *H04N 9/3155* (2013.01); *H05B 41/2928* (2013.01); *H05B 41/36* (2013.01)

(56) References Cited

U.S. PATENT DOCUMENTS

| | | | |
|---|---|---|---|
| 2013/0134899 A1* | 5/2013 | Magg | H05B 41/2928 315/291 |
| 2014/0340656 A1 | 11/2014 | Mueller et al. | |
| 2015/0077018 A1 | 3/2015 | Wolter et al. | |

FOREIGN PATENT DOCUMENTS

| | | |
|---|---|---|
| DE | 102009006338 A1 | 9/2010 |
| DE | 10 2010 039 221 A1 | 2/2012 |
| DE | 10 2011 089 592 A1 | 6/2013 |
| EP | 2168408 B1 | 7/2011 |
| WO | 2013092750 A1 | 6/2013 |
| WO | 2013131802 A1 | 9/2013 |

OTHER PUBLICATIONS

Chinese Office Action based on application No. 201580054673.8 (8 pages) dated Feb. 5, 2018.

* cited by examiner

PROJECTION DEVICE AND METHOD FOR PROJECTING AT LEAST ONE IMAGE ONTO A PROJECTION SURFACE

RELATED APPLICATIONS

The present application is a national stage entry according to 35 U.S.C. § 371 of PCT application No.: PCT/EP2015/072321 filed on Sep. 29, 2015, which claims priority from German application No.: 10 2014 220 275.2 filed on Oct. 7, 2014, and is incorporated herein by reference in its entirety.

TECHNICAL FIELD

The present disclosure relates to a projection device for projecting at least one image onto a projection surface, which includes at least one discharge lamp with a first electrode and a second electrode as well as a control device for driving the discharge lamp. The control device is here designed to drive the discharge lamp in such a way that the at least one image is projected with a specifiable refresh rate onto the projection surface, wherein the control device is designed to provide at least one base current waveform for driving the discharge lamp, wherein the base current waveform ($WF_0$) exhibits a current commutation scheme that is described by a commutation vector (K) that includes a binary value for specifiable locations of a possible current commutation which states whether a current commutation takes place at the location concerned. The projection device also includes a measuring device for determining a measured value correlated to a state variable of the discharge lamp. The control device in itself already represents one aspect of the present disclosure. The present disclosure furthermore relates to a corresponding method for projecting at least one image onto a projection surface by means of a projection device.

BACKGROUND

Gas discharge lamps for use in video projection applications are usually so-called AC-operated short-arc lamps, which, to achieve a high optical imaging quality, provide an arc length of about 1 millimeter, as a result of which there are special requirements on the stability of the electrode geometry. Lamps of this sort are identified, depending on the manufacturer, as P-VIP lamps or UHP lamps, for example. A typical operating method of a lamp of this sort consists in the injection of a current, with an amplitude that remains constant or whose level is modulated, into the lamp, while the current direction is reversed at particular times by a commutation device. Depending on the projection technology, it is necessary, in addition to these requirements for electrode stabilization, to match the mode of the lamp's operation closely to the customer's specified application. In DLP (Digital Light Processing) projectors in particular, precise synchronization with the color wheel that is usually used there must take place. This color wheel rotates in the beam path of the projector, and includes a plurality of color segments to which different colors are assigned, and each of which can have a different length. Different colors of a video image are in this way projected in sequence. Modern DLP projectors furthermore have an adjusting facility which permits an individual configuration of the lamp current levels in the individual color segments (Unishapem). Through this, for example, a higher brightness can result from an increase in the white segment, or a better color reproduction through appropriate adjustment of the individual colors to one another. Typically, a customer can define a plurality, for example three to seven, current curves for different sets of brightnesses in the individual segments, and can store these in a so-called EEPROM memory.

Expediently, a commutation is made at the transitions between the individual color segments of the color wheel, at the so-called spokes. The drop in brightness that is entailed by the commutation of the current is not then perceptible to the user, since the mixed colors arising at the spokes are in any case masked by the projector or, for example, are used in order to increase the proportion of white light (so-called spoke light recapture). In addition, so-called maintenance pulses, which represent increases in current arranged immediately before a commutation, advantageously affect the development or reshaping of an electrode tip. The curve of the amplitude of the lamp current and the pattern of the commutations thus have a fundamental effect on the behavior of the electrodes of the discharge lamp.

The electrode behavior for all lamps of a particular lamp type is not identical here, and in addition the electrode geometry also changes throughout the service life. Variations of the parameters of a lamp type, for example in the context of manufacturing tolerances, are not taken into account by the prior art; a current waveform that optimally operates a first lamp of a particular lamp type fresh from the factory can be less well-suited to another lamp of the same type. In this context, optimally operating means achieving a maximum useful life of the lamp.

Typically, a discharge lamp of this sort is operated in a power-regulated mode, meaning that a constant mean power is fed to the lamp. Due to the unavoidable electrode burn-back over the service life, the effective distance between the two electrodes rises, as does therefore also the burn voltage, as a result of which the current through the discharge lamp correspondingly falls while maintaining an average lamp power. The changed current itself again has an effect on the electrode geometry and the electrode reshaping during the service life.

In terms of a stable lamp operation, a local peak is formed at the starting point of the arc on each of the two electrodes, whereby jumping of the arc on the electrode surface is prevented. The shaping of the peak here is to be kept in a suitable surface area, within which the electrode tip is just molten at the starting point of the arc. Since the electrode is subject to greater thermal stress when acting as an anode than when acting as a cathode, it is necessary to ensure an equal thermal stress on the two tips through an appropriate temporal sequence of the commutations. The formation of the electrode tips can be positively affected by a suitable shaping of the current waveform, in particular if the temporal behavior of the current waveform, and the cyclic melting and re-cooling of the tip material associated with it, leads to a transport of material from regions behind the tip forwards into the tip.

In this connection, EP 2 168 408 B1 discloses a method for driving a gas discharge lamp, wherein an operating frequency of the lamp is switched from a first frequency value to a second frequency value, whereby in a first operating mode a growing tip results on an electrode of the lamp, and in a second operating mode the tip on the electrode is at least partially re-melted.

A method for operating a gas discharge lamp is known from DE 10 2009 006 338 A1, in which a repeated application of a DC phase takes place with a predetermined temporal spacing.

According to the known prior art, however, it is assumed that all the lamps change in the same, predictable manner as their service life continues. Experience shows, however, that this is not the case.

It is therefore desirable to achieve an improved lifetime performance.

SUMMARY

It is the object of the present disclosure to provide a projection device that operates an AC-operated discharge lamp in such a way that the lifetime performance is improved in a particularly simple manner.

Figure 11:
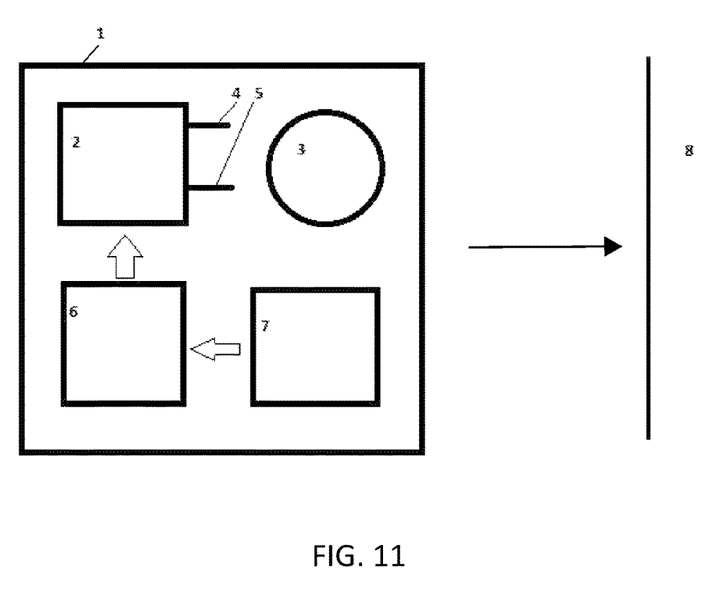
FIG. 11 shows a projection device with a projection surface.

This object is achieved by a projection device with the features of claim 1 as shown in FIG. 11 and by a method with the features of claim 17. Further advantageous embodiments emerge from the subsidiary claims.

According to the present disclosure, a generic projection device 1 is further developed in such a way that the control device 6 is designed, on the basis of an evaluation of at least one measured value of the measuring device 7 determined during a drive of the discharge lamp 2 with a current waveform to be checked, to check the current waveform in respect of its suitability for minimizing an electrode burn-back of the first electrode 4 and the second electrode 5, and in the case of a positive check result to retain the checked current waveform, and in the case of a negative check result, depending on a checked commutation vector characterizing the checked current waveform, to create, by means of a specifiable algorithm, a modified commutation vector that characterizes a modified current waveform.

The present disclosure is based on the recognition that a lengthening of the service life of the lamp 2 as compared with the method according to the prior art is achieved in that the effective distance between the two electrodes 4, 5, which is given by the distance of the two starting points of the arc and thus affects the length of the discharge arc, is kept for as long as possible within a specific range by means of a suitable, lamp-protecting mode of operation.

Through an adaptive current waveform, depending on the initial state of the electrodes 4, 5 which is subject to a certain degree of scatter, and/or as a result of an irreversible burn-back of the electrodes 4, 5 arising during the previous burning time, it is thus possible, within the scope of the remaining possibilities, for a further electrode burn-back to be reduced, in particular minimized. On the basis of the tracking of the operating mode, optimized respectively for the current lamp state, in the form of the drive with an adaptive current waveform, it is moreover possible to achieve a constant voltage trend, which means a steady rise in the lamp burning voltage through the entire service life of the lamp 2. This results in the advantage that, even for an ensemble of lamps, a lower scatter in the aging process results, which means that the average length of all the discharge arcs of an ensemble of lamps diverges less sharply over the whole period of lamp operation. This effect is of great interest in particular for multi-lamp projectors and for multi-projector applications.

At the same time the way in which the current waveform changes ensures that the color matching of the projector is not changed, in particular in the case of DLP projectors. From this results the advantage that a predefined current waveform, which already represents a good approximation to the "ideal form" for a large number of lamps, and which in particular can be individualized through customer-specific modifications, acts as the initial basis for a current waveform to be generated. It is ensured through this that a change to the luminous flux in a phase of the current waveform that is assigned to a segment of the color wheel 3, which would lead to a shift in the color matching made by the customer, does not occur as a result of a change that serves the purpose of adapting an electrode state. As a further advantage of the provision of an adapted current waveform in the course of operation of the projection device 1, it emerges that the process can take place unnoticed by the customer.

The projection device 1 can, advantageously, be implemented as a DLP projector and include a color wheel 3 with a specifiable number of color segments, through which each position of a possible current commutation is determined. The base current waveform here exhibits a current commutation scheme that is described by a commutation vector that includes a binary value for each of the positions determined by the color wheel 3 as the location of a possible current commutation, said value indicating whether a current commutation takes place at the location concerned.

The present disclosure is, of course, not restricted to projection devices with a DLP-based micro-mirror array, in which a sequential generation of the individual colors of the projected image takes place.

It is, rather, also applicable to projection devices that are formed as LCD (liquid crystal display) projectors with parallel, i.e. simultaneous, provision of the individual color components for projecting at least one image onto a projection surface 8. Corresponding considerations also apply to 3-chip DLP systems, in which, in a similar manner, a simultaneous processing of the individual color components takes place.

It is thus also usable for projection devices 1 in which no color wheel or equivalent equipment for generating the individual color components of the projected image is present. In this case there are more degrees of freedom in respect of the positioning of possible commutation times within a projection interval, i.e. the inverse of the image refresh rate. The distribution of possible commutation times over the projection interval can then be oriented entirely to a desired electrode burn-back behavior. In particular, the time grid on which the commutation vector is based can be designed such that a large number of frequency components in the possible current waveforms can be generated with a comparatively low number of possible commutation locations, which determines the dimension of the commutation vector. In particular, the form of the time grid can be linear or non-linear and/or have different scalings in different sections. Leaving aside the number of degrees of freedom available, the fundamental relationships between the drive of a lamp with a particular current waveform and their effect on the geometry of the electrode tips are, however, independent of the respective projection technology. The embodiments shown here and below are therefore in principle applicable both to DLP applications and to LCD applications.

Advantageously the control device 6 can be designed to perform the evaluation of at least one measuring value of the measurement device 7 in the form of a determination of a rate of change within a specifiable test time interval.

A tendency in the development of an electrode under the influence of a particular current waveform can be diagnosed through this in a particularly simple manner.

In a preferred form of embodiment, the control device 6 can be designed to perform the evaluation of at least one measured value of the measuring device 7 in the form of a trend analysis of a specified number of measured values over a specifiable time interval.

The advantage emerges from this in particular that further information, such as for example small jumps, kinks or the like, in a curve can be diagnosed.

Advantageously, the control device 6 can be designed to perform the testing of the current waveform in respect of its suitability for minimization of an electrode burn-back of the first electrode 4 and the second electrode 5 in a dimmed operating state of the discharge lamp 2, in which the power currently being drawn by the discharge lamp 2 is at most 90% of the rated power of the discharge lamp 2, advantageously at most 80%, in particular at most 70%.

Advantageously, the power currently drawn by the discharge lamp 2 in the dimmed operating state can be at least 20% of the rated power of the discharge lamp 2, advantageously at least 30%, in particular at least 40%.

The testing of the current waveform at a reduced power of the discharge lamp 2 is in particular advantageous, since the reaction of the lamp 2 to the current waveform then takes place significantly more quickly than at operation with the rated power, which offers the opportunity of earlier manipulation. As a result, a longer operation with a current waveform that is unfavorable for the lamp 2, which can cause increased damage to the electrodes, can in particular be prevented.

In an advantageous embodiment, the control device 6 can be designed to carry out the drive of the discharge lamp 2 during a test phase with a direct current for the detectability of an electrode tip state of whichever of the first electrode 4 or the second electrode 5 is being operated as the anode during the test phase.

This yields the advantage that a more precise, individual conclusion about the respective electrode state is possible. A test phase of this sort can be configured in accordance with the teaching of WO 2013/131802 A1.

Advantageously the measuring device 7 can be designed to determine an electrical voltage between the first electrode 4 and the second electrode 5 as the state magnitude of the discharge lamp 2.

In a more developed form of embodiment, the control device 6 can be designed to provide the positive test result in respect of the suitability of the current waveform for the minimization of an electrode burn-back of the first electrode 4 and of the second electrode 5 when a voltage change, as a change in the electrical voltage in the course of a specifiable measuring time interval, adopts at least the value of a lower voltage threshold and at most the value of an upper voltage threshold, and to provide the negative test result when the voltage change adopts a value outside a range specified by the lower voltage threshold and by the upper voltage threshold.

A good correlation to the growth behavior of the electrode tips is provided by this; a lowering voltage indicates that the two electrodes are growing together, while a rising voltage indicates that the electrode tips are melting away.

The control device 6 can particularly advantageously be designed to set an uneven number of commutations within one periodicity interval of the current waveform when generating a modified commutation vector.

This yields the advantage that a zero-mean current waveform necessarily arises, which means that no direct current component that could disturb the thermal equilibrium between the first electrode 4 and the second electrode 5 is present in the lamp current.

In an advantageous form of embodiment, the control device 6 can be designed to set a specifiable frequency-modulation factor of the modified current waveform when generating the modified commutation vector. According to the teaching of DE 10 2011 089 592 A1, which discloses a DLP projector and a method for projecting at least one image onto a projection surface, in which the modulation factor of the current waveform is at least 3, the current waveform includes at least one first region to which a first frequency is assigned, as well as a second region to which a second frequency is assigned. The first region is determined by a first commutation and a subsequent second commutation, whereas the second region is determined by the region between a second commutation and a subsequent first commutation. The first frequency is calculated as $f_1 = 1/(2*T1)$, where T1 refers to the period of time between the first and second commutations. The second frequency is calculated as $$f_2 = n \bigg/ \bigg( 2 * \sum_{i=1}^{n} T_i \bigg),$$

where $T_i$ relates to the periods of time from one commutation to the next commutation within the second region, while n represents the number of such periods of time within the second region. The above-mentioned modulation factor is defined by the ratio of the second frequency to the first frequency. Put more precisely, this is a frequency modulation factor, and not something like an amplitude modulation factor.

In a preferred form of embodiment, the control device 6 can be designed to set a mean frequency generated by the commutations within a frequency range defined by a specifiable minimum frequency and/or by a specifiable maximum frequency when generating the modified commutation vector related to individual segments or to the entire sequence of the modified current waveform.

Through this it is in particular possible to prevent negative side-effects, for example variations in the light in the form of flickers and/or scintillations that are perceptible to the user.

In a preferred form of embodiment, the control device 6 can be designed to evaluate a configuration vector that is designed to identify specifiable positions of a possible commutation as the position of an unwanted commutation or as the position of a preferred, active commutation when generating the modified commutation vector.

Through this a so-called maintenance pulse can, for example, be arranged within the current waveform such that a commutation always takes place immediately after it.

In a preferred form of embodiment, the control device 6 can be designed to determine, on the basis of the checked commutation vector, the modified commutation vector from the checked commutation vector in such a way that an inactive first position of the checked commutation vector which is adjacent to an active second position of the checked commutation vector is set to active in the modified commutation vector, and the active second position of the checked commutation vector is set to inactive in the modified commutation vector.

In this way a commutation is merely shifted to a neighboring position of the commutation vector, while the number of commutations remains the same and the lamp frequency is unchanged. The frequency composition is changed by this, and thus also the frequency modulation factor described above.

In a further preferred form of embodiment, the control device 6 can be designed to determine, on the basis of the checked commutation vector, the modified commutation vector from the checked commutation vector in such a way that either an inactive first position of the checked commutation vector which is adjacent to an active second position of the checked commutation vector is set to active in the modified commutation vector, or an active first position of the checked commutation vector which is adjacent to an active second position of the checked commutation vector is set to inactive in the modified commutation vector.

In this way a particularly simple variation of the commutation vector, starting from the original base commutation vector, can be achieved.

A control device 6 according to the present disclosure is designed for use in a projection device 1 according to the present disclosure, and exhibits the features of the control device of the projection device 1 according to the present disclosure. This control device 6 can, in particular, be an electronic ballast (EB).

A method according to the present disclosure for projecting at least one image onto a projection surface 8 can proceed by means of a projection device 1, which includes at least one discharge lamp 2 with a first electrode 4 and a second electrode 5, and a control device 6 for driving the discharge lamp 2, wherein the control device 6 is designed to drive the discharge lamp 2 in such that at the least one image is projected with a specifiable refresh rate onto the projection surface 8. The control device 6 is here designed to provide at least one base current waveform for driving the discharge lamp 2, wherein the base current waveform exhibits a current commutation scheme that is described by a commutation vector that includes a binary value for each location of a possible current commutation which states whether a current commutation takes place at the location concerned, as well as a measuring device 7 for determining a measured value correlated to a state variable of the discharge lamp 2. The operating method according to the present disclosure here contains the steps of: determining at least one measured value of the measuring device 7 during a drive of the discharge lamp 2 with a current waveform to be checked, checking the current waveform with respect to its suitability for minimizing an electrode burn-back of the first electrode 4 and the second electrode 5, on the basis of an evaluation of the at least one measured value, and in the case of a positive check result, retaining the checked current waveform in a subsequent cycle, and in the case of a negative check result, depending on a checked commutation vector characterizing the checked current waveform, generating a modified commutation vector that characterizes a modified current waveform by means of a specifiable algorithm.

The preferred embodiments presented with reference to a projection device 1 according to the present disclosure and their advantages apply correspondingly, inasmuch as applicable, to the method according to the present disclosure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
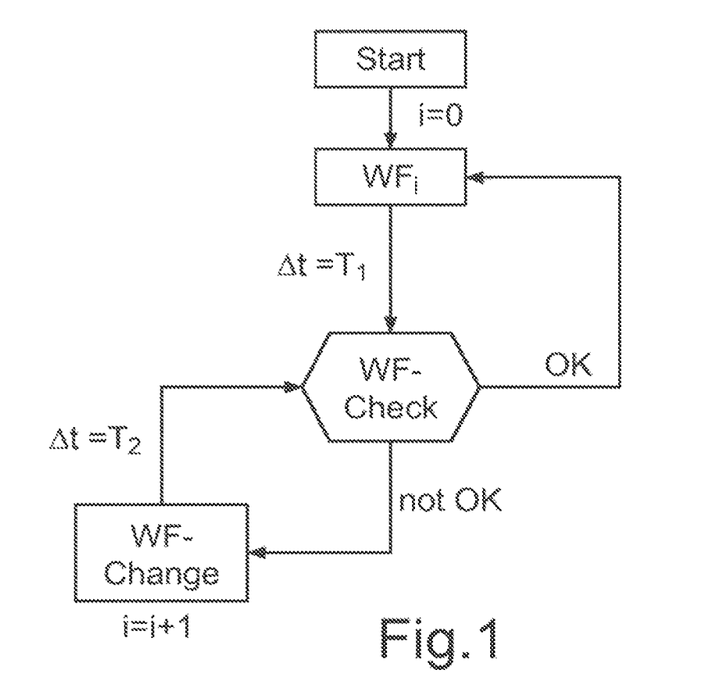
FIG. 1 shows a simplified, schematic illustration of a form of embodiment of the operating method according to the present disclosure.

A simplified schematic illustration of an operating method according to the present disclosure is illustrated in FIG. 1. The starting point is a base current waveform $WF_0$, which has previously been determined by the manufacturer by means of extensive series of tests, for example in endurance tests with a specific number of test items in order to determine the aging behavior and/or the synchronization of an ensemble of lamps, in appropriate cases with the assistance of direct measurement methods for assessing the electrode geometry in that, for example, the discharge arc is projected by means of a suitable lens onto an observation screen.

Figure 2:
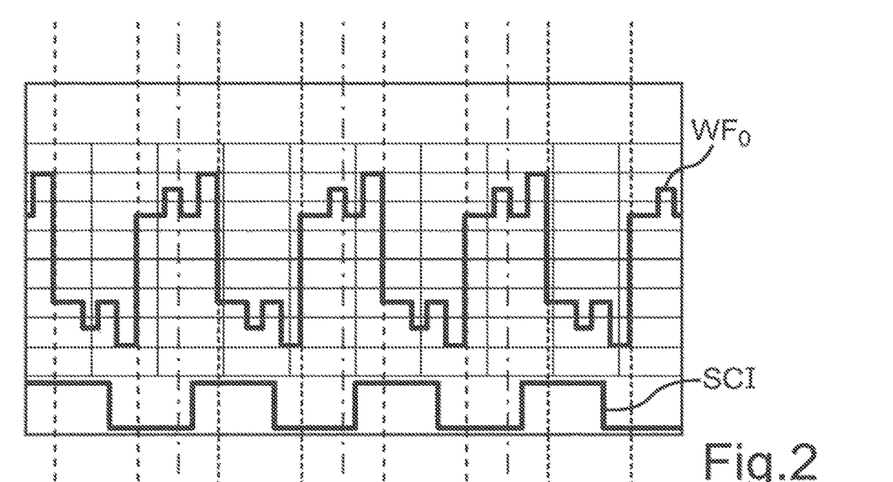
FIG. 2 shows an exemplary base current waveform $WF_0$.

FIG. 2 shows an exemplary current waveform $WF_0$; the second curve, with a rectangular shape, shows a synchronization signal SCI, which inverts its value with every rotation of a color wheel 3. Usually, an image refresh frequency/frame rate is 60 hertz (NTSC) or 50 hertz (PAL), wherein, in a preferred form of embodiment, a DLP projector with a color wheel 3 is used, wherein the color wheel 3 makes two rotations for each video frame. Thus, for example, with a 60 hertz image refresh rate and two color wheel rotations, in the example illustrated with one commutation for each rotation of the color wheel 3, a lamp frequency of 60 hertz results.

The base current waveform $WF_0$ used as the starting point has a symmetrical structure, to the extent that the anode and cathode phase of a first electrode 4 are always of equal length. Following the start, a running index i is at first 0, and the current waveform $WF_0$ corresponding to $WF_i$ (i=0) is made available for a specifiable first time $T_1$ for output to the lamp 2.

Based on a drive of the lamp 2 with this current waveform $WF_0$, at the beginning of operation (T=0 hours) a lamp voltage U can now, for example, be 75 volts, a lamp power P can be 190 watts, and a lamp current I can be 2.53 amperes.

In the example illustrated, the first time $T_1$=10 hours. As a rule, a time that is sufficiently long to obtain a reliable conclusion about a voltage trend should be chosen. After the waiting time $\Delta t = T_1$ has elapsed, the current waveform now being provided, $WF_i$ (i=0), is checked. This check is carried out according to the illustration in FIG. 1 by a first function block WF-Check, for example in the form of a measurement of six sequential measurements of the lamp voltage U at intervals of 10 minutes.

Figure 3:
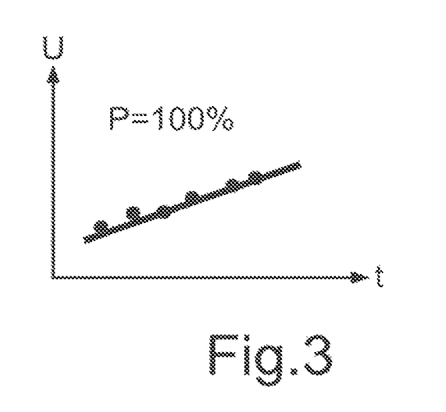
FIG. 3 shows an exemplary series of measurements at a first time point.

FIG. 3 shows an exemplary measurement on a scatter plot, in which the time t is plotted schematically on the abscissa, and the lamp voltage U on the ordinate. In addition to the six measurement points, a linear regression line, with which a gradient dU/dt can be determined, is also drawn for illustration. The linear regression line drawn here stands in representatively for a possible implementation for calculation of the value of dU/dt. This can, for example, be 0.05 volts/hour.

As a possible criterion for checking the suitability for minimization of an electrode burn-back, a maximum permitted voltage change rate is defined as dU/dt=+/−0.1 volts/hour. The measured rate of change of 0.05 volts/hour thus lies in the defined range, as a consequence of which the present current waveform $WF_0$ is retained, and a check is made again after the first time $T_1$ has elapsed.

At T=10 hours, for example, the lamp voltage U is 77 volts, the lamp power P is 190 watts, and the lamp current I is 2.47 amperes. After a further waiting time $\Delta t=T_1$ has elapsed, a further check is made of the current waveform $WF_i$ (i=0) presently being provided, at an operating time of T=20 hours.

Figure 4:
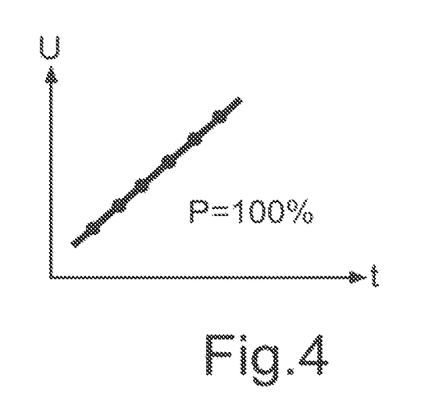
FIG. 4 shows an exemplary series of measurements at a second time point.

FIG. 4 shows for this purpose a scatter plot of an exemplary measurement. In comparison with the similar illustration of FIG. 3, the linear regression line has a significantly higher gradient, being for example 0.125 volts/hour.

The criterion for the test of suitability for minimization of an electrode burn-back (dU/dt=+/−0.1 volts/hour) would thus not be satisfied, and the flow branches to a second function block, WF-Change. This changes the current waveform $WF_0$ used most recently for drive of the lamp 2 in such a way that it modifies a commutation vector $K_0$ that characterizes the current waveform $WF_0$ in that it inserts a further commutation.

Different forms of embodiment of the second function block WF-Change, which may include at least one of the following features in any combination, are conceivable here. With n segments, $2^n$ waveform schemes are theoretically possible (typically: 8 to 12 segments, meaning between 256 and 4096 waveforms).

It should be noted here that useful secondary constraints can significantly reduce the number of possibilities, for example the requirement for an uneven number of commutations within one periodicity interval of the current waveform, so that a direct component is not present in the lamp current. The relevant periodicity interval correlates here with the above-mentioned image refresh frequency/frame rate.

In addition, it may be that a particular modulation factor is to be maintained, determined, for example, according to the teaching of DE 10 2011 089 592 A1.

Minimum or maximum frequencies that are to be maintained, averaged over individual waveform sections or over the entire current waveform, may also be specified.

The individual positions of the commutation vector can, furthermore, be marked by a flag indicating whether, at the corresponding location, no commutation is to take place or that advantageously a commutation is to take place. Such a preferencing can also be expressed as a vector, for example in the form (0+1 0 0−1 0+1 0)

where 0 stands for indifferent weighting, −1 for a commutation to be suppressed, and +1 for a commutation to be preferentially activated.

With purely binary representation, the preferencing can be performed by a 2*n matrix, where $$\begin{pmatrix} 0 & 1 & 0 & 0 & 0 & 0 & 1 & 0 \\ 0 & 0 & 0 & 0 & 1 & 0 & 0 & 0 \end{pmatrix}$$

describes the same configuration as before.

In a first pass, the current waveform $WF_i$ can be changed in such a way that one of the commutations is shifted to a neighboring position of the commutation vector, meaning that a commutation vector $K_i$=(0 1 1 0 0 0 1 0)

can be changed to a commutation vector $K_{i+1}$=(0 1 1 0 0 0 0 1).

During a shift in the opposite direction, the following commutation vector would also be conceivable:

$K_{i+1}$=(0 1 1 0 0 1 0 0).

The modified commutation vector $K_{i+1}$ is to be verified, and to be rejected if necessary, in accordance with the secondary constraints that are to be taken into account, as described above. If rejected, another commutation vector $K_{i+1}$ is to be determined. Known algorithms, such as for example the "random walk" or the "downhill simplex", can be used to determine the modified commutation vector $K_{i+1}$.

Figure 5:
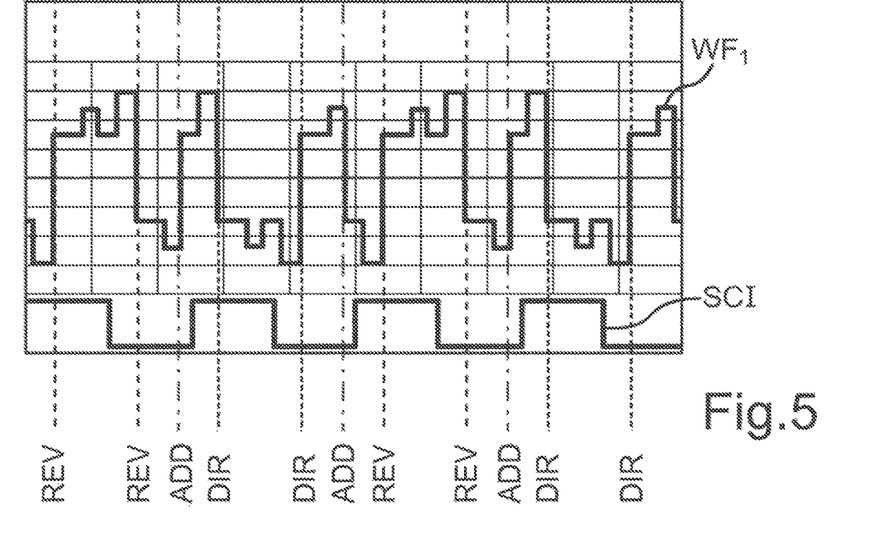
FIG. 5 shows an exemplary first current waveform $WF_1$.

A first current waveform $WF_1$ derived from the base current waveform $WF_0$ is illustrated in FIG. 5. Here, in an interval given by two color wheel rotations, a third commutation is added to the two commutations that already exist. The two current waveforms $WF_0$ and $WF_1$ are arranged directly under one another in FIGS. 2 and 5, and have been given vertical orientation lines which, at locations with a communication of the same phase, meaning with a change in current direction of the current waveform $WF_0$ and of the current waveform $WF_1$ simultaneously from a positive direction into a negative direction, or simultaneously from a negative direction into a positive direction, are labeled with DIR, and at a counter-phase commutation, meaning that with an opposing change in current direction of the two current waveforms $WF_0$ and $WF_1$, wherein one of the two current waveforms changes from a positive direction into a negative direction and at the same time the other from a negative direction into a positive direction, are labeled with REV. The locations of the newly added third commutation are labeled with ADD.

In addition to the generation of new frequencies with a markedly asymmetric current waveform $WF_1$, it can furthermore be seen that as a result of the insertion of commutations, the mean lamp frequency rises, in the example illustrated from 60 Hz to 90 Hz. The mean lamp frequency is here given as ½ times the number of commutations per frame, times the frame frequency. For this reason, the current waveform $WF_1$ leads to a changed growth behavior of peaks on the electrodes of the discharge lamp as compared with the current waveform $WF_0$.

The advantages of the uneven number of commutations in terms of a current waveform that, as a matter of principle, does not contain a DC component, must therefore be weighed against the possible disadvantages that arise through the introduction of visually perceptible refresh frequencies of individual color segments (scintillations). The previously-named secondary constraints in terms of minimum or maximum frequencies can here advantageously be considered to prevent further unwanted disturbances.

Based on a drive of the lamp with the current waveform $WF_1$, at, for example, T=20 hours, the lamp voltage U can be 80 volts, the lamp power P can be 190 watts, and the lamp current I can be 2.375 amperes.

As a result of the change of the current waveform used for drive of the lamp 2 from the current waveform $WF_0$ to the current waveform $WF_1$, the transfer of the current waveform is henceforth not carried out after a relatively long waiting time $\Delta t=T_1$, but after a second time $T_2$, which is advantageously significantly shorter than the first time $T_1$, wherein the second time $T_2$ can, for example, be 20 minutes.

After the waiting time $\Delta t=T_2$ has elapsed, the current waveform now being provided, $WF_i$ (i=1), is checked.

This check can, for example, be carried out in the form of a measurement of six sequential measurements of the lamp voltage U at intervals of 10 minutes, as already described above. The number of individual measurements can be reduced, and/or the interval between the individual measurements can be reduced, for the sake of a more quickly available result.

Figure 6:
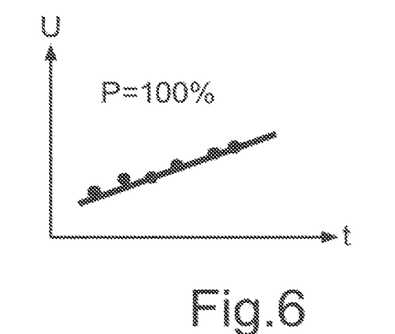
FIG. 6 shows an exemplary series of measurements at a third time point.

In this connection, FIG. 6 shows a scatter plot of an exemplary measurement. In comparison with the similar illustration of FIG. 3, the linear regression line has a gradient of a similar magnitude, being for example 0.06 volts/hour. The measured rate of change of 0.06 volts/hour thus lies in the defined range, as a consequence of which the present current waveform $WF_1$ is retained, and a check is made again after a waiting time $\Delta t$, which now again receives the value of the first time $T_1$, has elapsed.

Alternatively or in addition to a pure measurement of $\Delta U/\Delta t_m$ during a check interval, an intermediate storage of n voltage values can also be made every x seconds, and the evaluation of the voltage trend can be performed (trend analysis). Advantageously, here, a ring buffer to be described cyclically can be used. Through this, a more precise diagnosis of the electrode behavior is possible, in particular including immediately after a change in the commutation vector K on which the drive of the lamp is based.

A yet deeper analysis of the electrode state can be done through the deliberate introduction of DC test phases for assessment of the tip state in accordance with the teaching of WO 2013/131802 A1.

In particular, a further measuring device 7 can be present, by means of which a further state magnitude of the lamp is detected and made available for evaluation by the first function block WF-Check, for example the lamp current I or the lamp power P, which is advantageously determined indirectly through the power transferred via a direct voltage intermediate circuit of a ballast containing the drive of the discharge lamp.

In an advantageous form of embodiment, the first function block WF-Check can perform an evaluation of a rate of change $\Delta U/\Delta t_m$ of the lamp voltage U during a check interval $\Delta t_m=T_{check}$ in a dimmed state of the discharge lamp 2, wherein the power presently taken up by the discharge lamp 2 is at most 90% of the rated power of the discharge lamp 2, advantageously at most 80%, in particular at most 70%.

Since, as a result of the reduction of the electric power supplied, the brightness of the image projected through the projector also reduces, an operating state of this sort can advantageously be run in the switching-off process of the lamp, thereby being "hidden", unnoticed by the user of the projector. Alternatively or in addition, an operating state of the projector of this sort can also be run in a so-called dynamic dimming mode.

For example, in a normal operating state of the projector, the lamp voltage U can be 75 volts, the lamp power P can be 190 watts, and the lamp current I can be 2.53 amperes. Correspondingly, in an eco-operating state of the projector, the lamp voltage U can be 78 volts, the lamp power P can be 160 watts, and the lamp current I can be 2.05 amperes.

Figure 7:
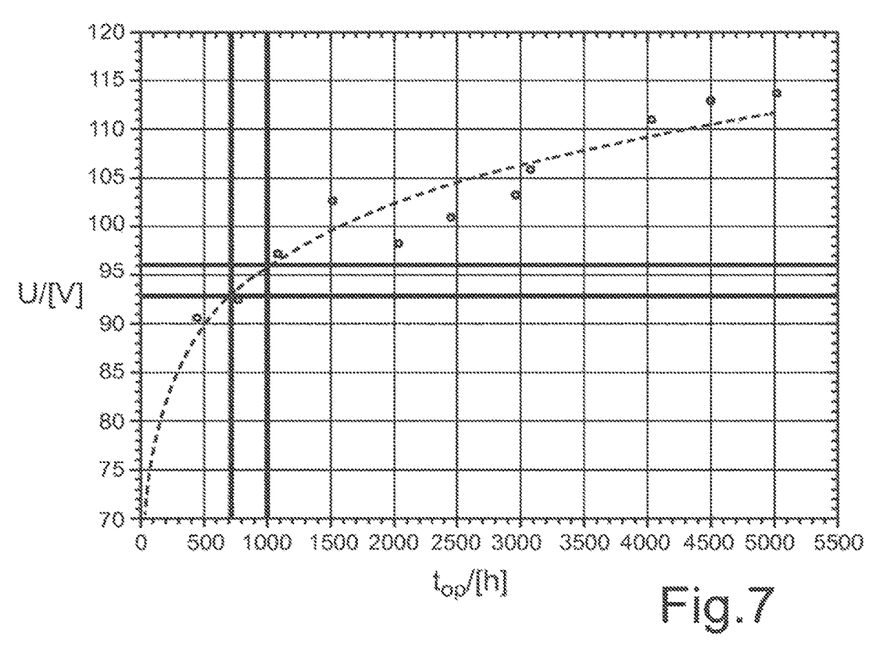
FIG. 7 shows an aging characteristic as a curve of the lamp voltage U against the duration of operation $t_{op}$.

A typical aging characteristic is shown in FIG. 7 as a curve of the lamp voltage U over an operating period $t_{op}$, wherein the operating period is plotted, scaled in the unit of hours, on the abscissa, and the lamp voltage U is plotted, scaled in the unit of volts, on the ordinate. The lamp current I=2.05 amperes which is present in the eco-operating state of the projector is achieved in the normal operating state of the projector at a lamp voltage U=190 watts/2.05 amperes=92.7 volts, in relation to a typical service life this would correspond to an operating period $t_{op}$ of approximately 700 hours. This means that the electrode behavior of a discharge lamp operated in a dimmed state can be thought of as comparable to that of an aged lamp that is being operated at its rated power.

To check the current waveform $WF_0$ that is provided for drive of the lamp after the start in respect of its suitability for minimizing an electrode burn-back, a change is henceforth made in accordance with the above-described aspect of the present disclosure at a time T=0 hours, at which, as in the first example, the lamp voltage U is 75 volts, the lamp power P is 190 watts and the lamp current I can be 2.53 amperes, into a dimming mode which can, for example, be the 160 watt eco-mode.

Figure 8:
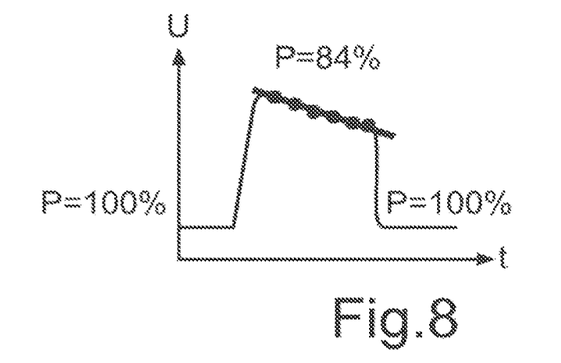
FIG. 8 shows an exemplary series of measurements at a first time point at reduced power.

A schematic illustration of a corresponding voltage curve is illustrated in FIG. 8. When dimming, the lamp voltage U jumps suddenly from 100% to 84%, and a constant rate of change is then visible in the further continuation in the dimmed state. Six measured values are, for example, evaluated over an evaluation interval $\Delta t_m$ of 3 minutes. The change in the voltage determined from the linear regression line is, for example, $\Delta U=-0.1$ volts. A specifiable criterion for $\Delta U=+0.1$ to $-0.3$ volts is thus satisfied. The current waveform $WF_0$ is thus retained, and a return is made to 100% operation.

Figure 9:
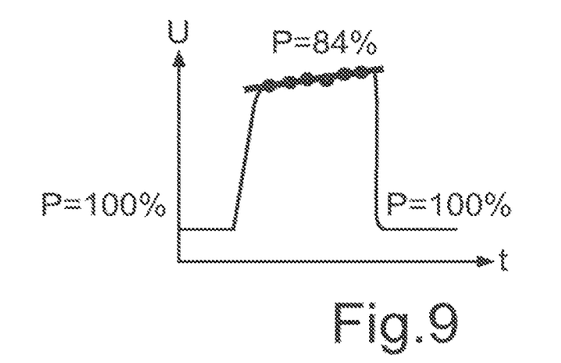
FIG. 9 shows an exemplary series of measurements at a second time point at reduced power.

Following a waiting time $\Delta t=T_1$, where in this example the first time $T_1$ can be 5 hours, the lamp voltage U is, for example, 78 volts, the lamp power P is 190 watts, and the lamp current I is 2.43 amperes. The power is now again reduced to 84% for the check by the first function unit WF-Check. The following measurement is illustrated, by way of example, in FIG. 9. Following the same evaluation process as was described before, it is found that $\Delta U=+0.15$ volts. This $\Delta U$ is outside the specified range for $\Delta U$ of +0.1 to −0.3 volts, as a result of which a change in the current waveform $WF_0$ is initiated according to the method already described. After the evaluation interval has elapsed, a return is made, as before, to 100% operation (normal operating state), and after a waiting time $\Delta t=T_2$, which can, for example, be 5 hours, a further check cycle takes place.

Figure 10:
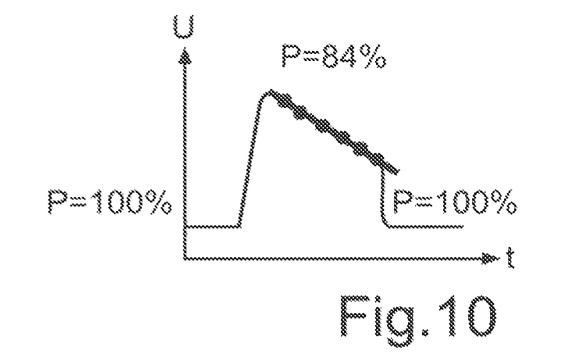
FIG. 10 shows an exemplary series of measurements at a third time point at reduced power.

With the current waveform $WF_1$ used for drive of the discharge lamp, at T=10 hours the lamp voltage U is, for example, is 76 volts, the lamp power P is 190 watts, and the lamp current I is 2.5 amperes. The voltage curve of the lamp voltage U after the change to 84% operation is illustrated in FIG. 10. The evaluation of the voltage change $\Delta U$ by means of the linear regression line here yields −0.2 volts. This value satisfies the specified criteria, according to which the value should be in the range from +0.1 volts to −0.3 volts.

The current waveform $WF_1$ is therefore retained, and the return is made to 100% operation. A new check is made according to the method already known after a further waiting time $\Delta t=T_1$.

The advantage of this method is that the reaction of the electrodes to the current waveform used for drive of the lamp takes place significantly more quickly, and thus an assessment of whether a concrete current waveform $WF_i$ is suitable for a lamp-protecting operation, meaning one that is aimed at achieving the longest possible service life.

The above-mentioned methods for obtaining information about the state of the electrodes and/or the development of the electrode geometry under the influence of a current waveform $WF_i$ for drive of the discharge lamp 2 defined by a particular commutation vector $K_i$ can be combined together in any desired way.

The embodiment only has the purpose of explaining the present disclosure, and does not restrict it. The advantages and features, as well as forms of embodiment, described for the method according to the present disclosure are equally applicable to the projection device 1 according to the present disclosure, and vice versa. Consequently, corresponding device features can be provided for method features, and vice versa.

Finally it is thus shown how through the use of adaptive current waveforms for the operation of P-VIP lamps, an improved service life performance, a constant voltage trend and a lower scatter in an ensemble of lamps can all be achieved.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A projection device for projecting at least one image onto a projection surface, comprising:
   at least one discharge lamp operated by alternating current with a first electrode and a second electrode,
   a control device for driving the discharge lamp, wherein the control device is designed to drive the discharge lamp in such a way that the at least one image is projected with a specifiable refresh rate onto the projection surface, wherein the control device is designed to provide at least one base current waveform for driving the discharge lamp, wherein the base current waveform exhibits a current commutation scheme that is described by a commutation vector that comprises a binary value for specifiable locations of a possible current commutation which states whether a current commutation takes place at the location concerned, and
   a measuring device for determining a measured value correlated to a state variable of the discharge lamp,
wherein
the control device is designed, on the basis of an evaluation of at least one measured value of the measuring device determined during a drive of the discharge lamp with a current waveform to be checked, to check the current waveform in respect of its suitability for minimizing an electrode burn-back of the first electrode and the second electrode, and
   in the case of a positive check result, to retain the checked current waveform, and
   in the case of a negative check result, depending on a checked commutation vector characterizing the checked current waveform, to create, by means of a specifiable algorithm, a modified commutation vector that characterizes a modified current waveform.

2. The projection device as claimed in claim 1, further comprising a color wheel with a specifiable number of color segments, through which each position of a possible current commutation is determined, wherein the projection device is implemented as a DLP projector.

3. The projection device as claimed in claim 1, wherein the projection device is implemented as an LCD projector which is designed to provide the individual color components for projecting at least one image onto a projection surface simultaneously.

4. The projection device as claimed in claim 1, wherein the control device is designed to perform the evaluation of at least one measured value of the measuring device in the form of a determination of a rate of change within a specifiable test time interval.

5. The projection device as claimed in claim 1, wherein the control device is designed to perform the evaluation of at least one measured value of the measuring device in the form of a trend analysis of a specified number of measured values over a specifiable time interval.

6. The projection device as claimed in claim 1, wherein the control device is designed to perform the testing of the current waveform in respect of its suitability for minimization of an electrode burn-back of the first electrode and the second electrode in a dimmed operating state of the discharge lamp, in which the power currently being drawn by the discharge lamp is at most 90% of the rated power of the discharge lamp.

7. The projection device as claimed in claim 1, wherein the control device is designed to carry out the drive of the discharge lamp during a test phase with a direct current for the detectability of an electrode tip state of whichever of the first electrode or the second electrode is being operated as the anode during the test phase.

8. The projection device as claimed in claim 1, wherein the measuring device is designed to determine an electrical voltage between the first electrode and the second electrode as the state magnitude of the discharge lamp.

9. The projection device as claimed in claim 8, wherein the control device is designed to provide the positive test result in respect of the suitability of the current waveform for the minimization of an electrode burn-back of the first electrode and of the second electrode when a voltage change, as a change in the electrical voltage in the course of a specifiable measuring time interval, adopts at least the value of a lower voltage threshold and at most the value of an upper voltage threshold, and to provide the negative test result when the voltage change adopts a value outside a range specified by the lower voltage threshold and by the upper voltage threshold.

10. The projection device as claimed in claim 1, wherein the control device is designed to set an uneven number of commutations when generating a modified commutation vector.

11. The projection device as claimed in claim 10, wherein the control device is designed to set a specifiable frequency modulation factor of the modified current waveform when generating the modified commutation vector.

12. The projection device as claimed in claim 10, wherein the control device is designed to set a mean frequency generated by the commutations within a frequency range defined by a specifiable minimum frequency and/or by a specifiable maximum frequency when generating the modified commutation vector related to individual segments or to the entire sequence of the modified current waveform.

13. The projection device as claimed in claim 10, wherein the control device is designed to evaluate a configuration vector that is designed to identify specifiable positions of a possible commutation as the positions of an unwanted commutation or as the positions of a preferred, active commutation when generating the modified commutation vector.

14. The projection device as claimed in claim 1, wherein the control device is designed to determine, on the basis of the checked commutation vector, the modified commutation vector from the checked commutation vector in such a way that an inactive first position of the checked commutation vector which is adjacent to an active second position of the checked commutation vector is set to active in the modified commutation vector, and the active second position of the checked commutation vector is set to inactive in the modified commutation vector.

15. The projection device as claimed in claim 1, wherein the control device is designed to determine, on the basis of the checked commutation vector, the modified commutation vector from the checked commutation vector in such a way that either an inactive first position of the checked commutation vector which is adjacent to an active second position of the checked commutation vector is set to active in the modified commutation vector, or an active first position of the checked commutation vector which is adjacent to an active second position of the checked commutation vector is set to inactive in the modified commutation vector.

16. The projection device as claimed in claim 1, wherein the control device is designed to perform the testing of the current waveform in respect of its suitability for minimization of an electrode burn-back of the first electrode and the second electrode in a dimmed operating state of the discharge lamp, in which the power currently being drawn by the discharge lamp is at most 80% of the rated power of the discharge lamp.

17. The projection device as claimed in claim 1, wherein the control device is designed to perform the testing of the current waveform in respect of its suitability for minimization of an electrode burn-back of the first electrode and the second electrode in a dimmed operating state of the discharge lamp, in which the power currently being drawn by the discharge lamp is at most 90% of the rated power of the discharge lamp.

18. A control device of a projection device for projecting at least one image onto a projection surface, the projection device comprising:
  at least one discharge lamp operated by alternating current with a first electrode and a second electrode,
  a control device for driving the discharge lamp, wherein the control device is designed to drive the discharge lamp in such a way that the at least one image is projected with a specifiable refresh rate onto the projection surface, wherein the control device is designed to provide at least one base current waveform for driving the discharge lamp, wherein the base current waveform exhibits a current commutation scheme that is described by a commutation vector that comprises a binary value for specifiable locations of a possible current commutation which states whether a current commutation takes place at the location concerned, and
  a measuring device for determining a measured value correlated to a state variable of the discharge lamp,
  wherein the control device is designed, on the basis of an evaluation of at least one measured value of the measuring device determined during a drive of the discharge lamp with a current waveform to be checked, to check the current waveform in respect of its suitability for minimizing an electrode burn-back of the first electrode and the second electrode,
  in the case of a positive check result, to retain the checked current waveform, and in the case of a negative check result, depending on a checked commutation vector characterizing the checked current waveform, to create, by means of a specifiable algorithm, a modified commutation vector that characterizes a modified current waveform.

19. A method for projecting at least one image onto a projection surface by means of a projection device, which comprises at least one discharge lamp with a first electrode and a second electrode, and a control device for driving the discharge lamp, wherein the control device is designed to drive the discharge lamp in such a way that the at least one image is projected with a specifiable refresh rate onto the projection surface, wherein the control device is designed to provide at least one base current waveform for driving the discharge lamp, wherein the base current waveform exhibits a current commutation scheme that is described by a commutation vector that comprises a binary value for each location of a specifiable current commutation which states whether a current commutation takes place at the location concerned, as well as a measuring device for determining a measured value correlated to a state variable of the discharge lamp,
  the method comprising:
    determining at least one measured value of the measuring device during a drive of the discharge lamp with a current waveform to be checked,
    checking the current waveform with respect to its suitability for minimizing an electrode burn-back of the first electrode and the second electrode, on the basis of an evaluation of the at least one measured value, and in the case of a positive check result, retaining the checked current waveform, and
    in the case of a negative check result, depending on a checked commutation vector characterizing the checked current waveform, generating a modified commutation vector that characterizes a modified current waveform by means of a specifiable algorithm.

* * * * *

UNITED STATES PATENT AND TRADEMARK OFFICE
CERTIFICATE OF CORRECTION

PATENT NO. : 10,073,335 B2
APPLICATION NO. : 15/517176
DATED : September 11, 2018
INVENTOR(S) : Marc Czichy et al.

Page 1 of 1

It is certified that error appears in the above-identified patent and that said Letters Patent is hereby corrected as shown below:

In the Specification

Column 1, Line 64: Please change the word "(Unishapem)" to the word "(Unishape™)".

Signed and Sealed this
Eighteenth Day of June, 2019

Andrei Iancu
*Director of the United States Patent and Trademark Office*